United States Patent
Nakanishi et al.

(10) Patent No.: US 7,404,866 B2
(45) Date of Patent: Jul. 29, 2008

(54) SLIDING MEMBER AND METHOD FOR MANUFACTURE THEREOF

(75) Inventors: Kazuyuki Nakanishi, Aichi (JP); Hideo Tachikawa, Aichi (JP); Hiroyuki Mori, Aichi (JP); Tadashi Oshima, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 561 days.

(21) Appl. No.: 10/480,653

(22) PCT Filed: Jun. 26, 2002

(86) PCT No.: PCT/JP02/06454

§ 371 (c)(1), (2), (4) Date: Dec. 29, 2003

(87) PCT Pub. No.: WO03/000946

PCT Pub. Date: Jan. 3, 2003

(65) Prior Publication Data

US 2004/0191110 A1  Sep. 30, 2004

(30) Foreign Application Priority Data

Jun. 26, 2001  (JP) ............... 2001-193046

(51) Int. Cl.
- C22C 38/12 (2006.01)
- C22C 9/00 (2006.01)
- C22C 21/00 (2006.01)
- C22C 47/16 (2006.01)

(52) U.S. Cl. ............ 148/423; 420/122; 420/123; 420/469; 420/528; 148/320; 148/432; 148/437; 148/442; 427/453

(58) Field of Classification Search ............ 428/621; 205/212; 427/453
See application file for complete search history.

(56) References Cited

U.S. PATENT DOCUMENTS 5,879,816 A * 3/1999 Mori et al. ............... 428/621

FOREIGN PATENT DOCUMENTS

| EP | 777058 | 6/1997 |
|---|---|---|
| GB | 2190100 | * 5/1987 |
| JP | 53-42148 | 4/1978 |
| JP | 61-285293 | 12/1986 |
| JP | 63-14851 | 1/1988 |
| JP | 2-8343 | 1/1990 |
| JP | 3-23595 | 3/1991 |
| JP | 5-83599 | 11/1993 |
| JP | 6-63983 | 8/1994 |
| JP | 9-189330 | 7/1997 |
| JP | 9-189330 A | * 7/1997 |

(Continued)

Primary Examiner—John P. Sheehan
Assistant Examiner—Jessee Roe
(74) Attorney, Agent, or Firm—Oblon, Spivak, McClelland, Maier & Neustadt, P.C.

(57) ABSTRACT

A sliding member includes a superficial portion forming a sliding surface. The superficial portion includes an oxygen-containing alloy containing at least one metallic element selected from the group consisting of molybdenum and tungsten in an amount of from 2 to 80% by weight; and oxygen in an amount of from 0.5 to 15% by weight. The sliding member sustains lubricating characteristics given to the sliding surface over a long period of time to maintain a low friction coefficient and durability.

14 Claims, 1 Drawing Sheet

FOREIGN PATENT DOCUMENTS

| | | | |
|---|---|---|---|
| JP | 9-189330 A | * | 7/1997 |
| JP | 9-209189 | | 8/1997 |
| JP | 10-317002 | | 12/1998 |
| JP | 10-330774 | * | 12/1998 |
| JP | 2000-248352 | * | 9/2000 |
| JP | 2001-073167 | | 3/2001 |
| JP | 2001-192803 | | 7/2001 |
| JP | 2002-3962 | | 1/2002 |

* cited by examiner

SLIDING MEMBER AND METHOD FOR MANUFACTURE THEREOF

TECHNICAL FIELD

The present invention relates to a sliding member which is used in transportation machinery, such as automobiles and ships, general industrial machinery and the like, and a process for producing the same.

BACKGROUND ART

Automotive combustion engines are driven over a wide range of oil temperatures, revolution speeds and loads. Therefore, in order to improve the mileage, the lubricating oils are required to be good in terms of the friction characteristic under a wide range of service conditions. Accordingly, it has been difficult to cover a wide range of service conditions only by conventional lubricating oils in which a variety of additive agents, beginning with friction modifying agents, are combined. For example, when the oil temperatures are low, they have not carried out the formation reaction of sliding products sufficiently, or have worn to be unable to stay on the sliding surface so that they cannot lower the friction resistance stably.

On the other hand, from the aspect of sliding members, a method is disclosed in which inorganic composite films containing manganese phosphate or oxides of molybdenum or tungsten are formed by chemical conversion treatment. However, since the films are thin chemical conversion films whose thickness is a couple of micrometers, it is possible to secure the initial adaptability, but it has been difficult to maintain the lubricating characteristic over a long period of time because said thin films have been consumed. Moreover, a method has been taken in which solid lubricants are applied on the surface of sliding members, but, when solid lubricants are simply applied on the sliding surface, the solid lubricants are consumed so that they are removed from the sliding surface, and accordingly it has been difficult to maintain the lubricating characteristic over a long period of time.

In general, in machinery provided with sliding parts, lubricating oils have been used in order to make the operation smooth. Most of the lubricating parts of engines are put into fluidically lubricating states. However, in the top and bottom of dynamic valve systems or pistons, the wear inhibition has been generally given by the addition of zinc dithiophsophate or zinc dithiocarbamate.

In internal combustion engines, as the measure of friction loss reduction or mileage, lubricating oils have been used, in lubricating oils which a variety of additive agents, beginning with friction modifying agents, are combined as set forth in Japanese Examined Patent Publication (KOKOKU) No. 3-23,595 and the like, for example. Conventionally, in order to lower the friction coefficient of lubricating oils, the addition of organic molybdenum compounds, the combined compounding of organic molybdenum compounds and metallic cleaning agents (Japanese Examined Patent Publication (KOKOKU) No. 6-62,983, for instance), the combined compounding of organic molybdenum compounds and sulfuric compounds (Japanese Examined Patent Publication (KOKOKU) No. 5-83,599, for example) or the like has been known.

In the sliding between engine cams and shims, the lowered friction coefficient aiming at improving the mileage and the anti-wearability aiming at the durability have been required strongly. Conventionally, shims have been subjected to manganese phosphate treatments aiming at improving the initial adaptability in sliding. In Japanese Unexamined Patent Publication (KOKAI) No. 2001-73,167 and Japanese Unexamined Patent Publication (KOKAI) No. 9-209,189, there is disclosed a method in which inorganic composite films whose surface contains iron phosphate at least and further oxides of molybdenum and/or tungsten are formed on the surface of iron or steel sliding members by chemical conversion treatment.

DISCLOSURE OF INVENTION

The present invention has been done in view of the aforementioned circumstances, and it is an assignment to provide a sliding member which sustains the sliding characteristic given to the sliding surface over a long period of time to maintain the low friction coefficient and the durability.

(1) A sliding member according to the present invention comprises a superficial portion forming a sliding surface, at least the superficial portion comprising either one of oxygen-containing iron alloys, aluminum alloys and copper alloys containing: at least one metallic element selected from the group consisting of molybdenum and tungsten in an amount of from 2 to 80% by weight; and oxygen in an amount of from 0.5 to 15% by weight.

It can preferably comprise said at least one metallic element selected from the group consisting of molybdenum and tungsten in an amount of from 2 to 60% by weight, further preferably from 15 to 40% by weight.

Said oxygen-containing iron alloys, aluminum alloys or copper alloys can comprise added elements which have functions to enhance the hardness of these alloys and improve the anti-wearability. For example, it is advisable to add at least one element selected from the group consisting of chromium, nickel, manganese, carbon, silicon, copper, magnesium, zinc, tin, aluminum and iron. It is desirable that they can comprise the elements having functions to enhance the hardness of these alloys and improve the anti-wearability in an amount of 15% by weight or less.

A lubricating oil used together with said sliding member can preferably contain a sulfur-feeding component. Moreover, said sulfur-feeding component can be an organic molybdenum compound.

(2) A process for producing the present sliding member comprises a step of: fixing an alloy powder comprising at least one metallic element selected from the group consisting of molybdenum and tungsten in an amount of from 2 to 80% by weight in addition to iron, aluminum or copper, or the alloy powder further comprising at least one added element selected from the group consisting of chromium, nickel, manganese, carbon, silicon, copper, magnesium, zinc, tin, aluminum and iron, onto the surface of a base in an oxidizing atmosphere, thereby forming a sliding surface.

Here, said at least one metallic element selected from the group consisting of molybdenum and tungsten can preferably be comprisedin an amount of from 2 to 60% by weight, further preferably from 15 to 40% by weight.

The formation of said sliding surface can be carried out by thermal spraying said alloy powder in air or by sintering it in an oxidizing atmosphere.

Moreover, it can be carried out by thermal spraying or sintering a powder of oxygen-containing iron alloys, aluminum alloys or copper alloys containing molybdenum and/or tungsten in an oxygen-free atmosphere or oxidizing atmosphere.

BEST MODE FOR CARRYING OUT THE INVENTION

Figure 1:
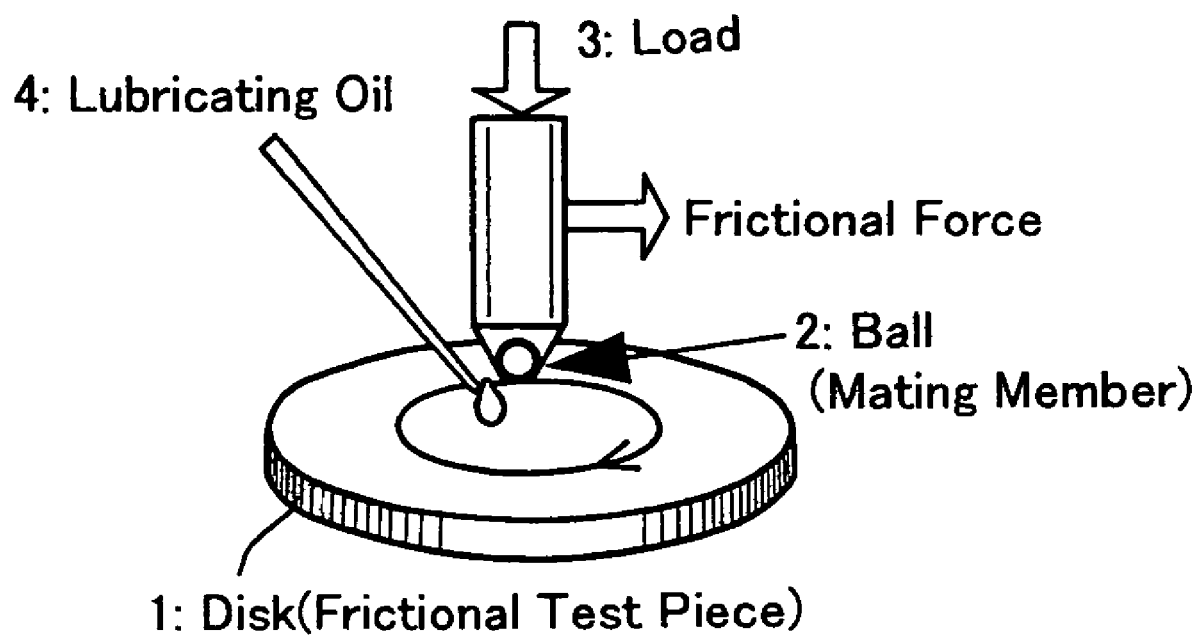
FIG. 1 is a schematic diagram for explaining the outline of a friction testing method in present examples.

The present sliding member comprises a superficial portion forming a sliding surface, at least the superficial portion comprising an oxygen-containing alloy containing: at least one metallic element selected from the group consisting of molybdenum and tungsten in an amount of from 2 to 80% by weight; and oxygen in an amount of from 0.5 to 15% by weight when the oxygen-containing alloy (hereinafter, the "oxygen-containing alloy" designates either one of iron alloys, aluminum alloys and copper alloys.) forming the sliding surface is taken as 100% by weight.

It is believed that the present invention operates and effects advantages in the following manner.

When sliding is carried out by using a lubricating oil containing a sulfur-feeding component on the sliding surface formed of the oxygen-containing alloy including molybdenum, the sulfur in the sulfur-feeding component and the oxygen-containing alloy including molybdenum undergo a tribological reaction to form a lubricating film of molybdenum disulfide, a solid lubricant. In this instance, when molybdenum oxide is formed on the surface of the sliding member, the formation of the molybdenum disulfide film is promoted so that the formed molybdenum disulfide is fastened firmly. On the sliding surface, molybdenum or tungsten is included in the oxygen-containing alloy, and oxygen is included as well, these elements are subjected to oxidation when the sliding surface is formed in an oxidizing atmosphere, and exist as oxides, a state that the oxides of molybdenum or the like are likely to generate.

When organic molybdenum compounds are included as the sulfur-feeding component, molybdenum is fed as well in addition to the sulfur in the organic molybdenum compounds so that the formation of molybdenum disulfide is promoted.

Since molybdenum oxides such as $MoO_2$ and $MoO_3$ exist in the alloy matrix of the sliding member, they are not come off easily from the surface by friction and are not consumed, contrary to thin films formed on the sliding surface. The oxygen-containing alloy can put molybdenum or tungsten into oxidizing states to firmly hold it in substrates. In order to do so, the oxygen-containing alloy can desirably be formed in a thickness of 1 μm or more at least. Due to the sliding surface, the friction reducing effect is shown, and it is possible to form sliding surfaces which sustain such durability that they are not stripped off with ease by sliding.

The formation of disulfides on the sliding surface is effected similarly in tungsten besides molybdenum, and is promoted when it is in oxidized states on the sliding surface, namely when it exists in the oxygen-containing alloy.

In order to do so, it is required that the superficial portion of the sliding part of the sliding member comprises an oxygen-containing alloy containing: at least one metallic element selected from the group consisting of molybdenum and tungsten in an amount of from 2 to 80% by weight; oxygen in an amount of from 0.5 to 15% by weight.

When the content of at least one metallic element included in the oxygen-containing alloy and selected from the group consisting of molybdenum and tungsten is less than 2% by weight, it is not preferable because it is not possible to let said metallic element and the oxides of said metallic element exist in the sliding surface sufficiently. When the content of said metallic element exceeds 80% by weight, it is not preferable because the qualities of the metallic matrix of the respective alloys degrade so that the films of sliding products cannot be held on the sliding surface. It can more preferably be from 2 to 60% by weight, and from 15 to 40% by weight can be a further desirable range.

Moreover, it is necessary for the oxygen content of the oxygen-containing alloy to oxidize the metallic element adjacent to the sliding surface, and it can be the most optimum content when the content falls in a range of from 0.5 to 15% by weight. When the oxygen content is so less that it is less than 0.5% by weight, it is not preferable because the amount of oxides existing in the surface is so less that the lubricating effect cannot be expected. Moreover, when the oxygen content exceeds 15% by weight, it is not preferable because its occupying proportion enlarges too much in the metallic matrix in the sliding surface so that the toughness is lost, and it is so brittle that it is likely to chip away.

Since the sliding surface of the present invention is formed by frame spraying and sintering in an oxidizing atmosphere, molybdenum, tungsten or the like included in the oxygen-containing alloy exists deep down inside the sliding surface in such a state that it is subjected to oxidation. From the fact, even when the surface of the sliding member is worn, molybdenum included inside the sliding surface is exposed as oxidized states, and reacts immediately with the sulfur of the sulfur-feeding component in lubricating oils so that the lubricant film of molybdenum disulfide is formed and restored, and accordingly it is possible to keep the friction resistance low stably.

The sulfur-feeding component included in the lubricating oil is substances which are capable of forming molybdenum disulfide by reacting with the oxides of molybdenum, and it is possible to name organic molybdenum such as molybdenum dialkyl sulfide thiocarbamate (common name: MODTC) and molybdenum dithiophsophate (common name: MODTP), sulfurized fatty substances such as sulfurized fatty acid esters known as sulfuric extreme-pressure agents, sulfurized sperm oils and sulfurized die oils, sulfurized paraffinic substances such as sulfurized α-olefins, sulfurized mineral oils, tertiary butyl sulfide, dibenzyl disulfide, sulfurized hydrocarbons, sulfurized polybutenes, sulfurized polyolefins, and simple sulfur, for example.

These substances can preferably mixed in lubricating oils so that they are in a dissolved state.

Usually, the sulfur-feeding component is included in lubricating oils in an amount of hundreds ppm approximately.

The production process of the present sliding member fixes an alloy powder comprising at least one metallic element selected from the group consisting of molybdenum and tungsten in an amount of from 2 to 80% by weight in addition to iron, aluminum or copper onto the surface of a base in an oxidizing atmosphere, thereby forming a sliding surface of oxygen-containing alloys. Moreover, it is possible to form the sliding surface by fixing the alloy powder further comprising one or more elements selected from the group consisting of nickel, chromium, manganese, carbon, silicon, copper, magnesium, zinc, tin, aluminum and iron onto the surface of a base in an oxidizing atmosphere. Since the processability of metallic matrices degrades when these elements are added in an amount exceeding 15% by weight, the addition amount can desirably be 15% by weight or less.

The production process of the present sliding member can be obtained by thermal spraying an alloy powder comprising one or more metallic elements selected from the group consisting of molybdenum and tungsten in an amount of from 2 to 80% by weight in addition to iron, aluminum or copper, onto the surface of sliding bases in an oxidizing atmosphere, for example, in air, to form a film, or by sintering the alloy powder in an oxidizing atmosphere to form the surface of sliding bases. Being subjected to heating treatments like thermal spraying or sintering in an oxidizing atmosphere, said alloy powder reacts with oxygen so that it is possible to obtain oxygen-containing alloy workpieces in which molybdenum or tungsten included in the alloy powder is oxidized.

Moreover, it is advisable to thermal spray or sinter an oxygen-containing alloy powder containing molybdenum and/or tungsten in an oxygen-free atmosphere or oxidizing atmosphere.

In addition, it is possible to form the sliding surface by heating an alloy powder in which one or more elements selected from the group consisting of chromium, nickel, manganese, carbon, silicon, copper, magnesium, zinc, tin, aluminum and iron are added to said alloy powder in an oxidizing atmosphere to fix it onto the surface of sliding bases. The heating can form oxygen-containing alloys which include oxygen in a desirable content by thermal spraying the alloy powder in air or sintering it in an oxidizing atmosphere.

The formation of said film can preferably be carried out by thermal spraying said alloy powder in air or sintering it in an oxidizing atmosphere. It is desirable that the oxygen-containing alloy films formed in the sliding surface can exist in a thickness of 1 μm and the superficial roughness can be 3 μm or less in view of sustaining the durability and friction coefficient reduction.

EXAMPLES

Hereinafter, it will be described specifically with reference to examples.

(1) Example No. 1

An Fe-2.5% Mo alloy powder was thermal sprayed with a plasma thermal spraying apparatus in atmospheric air onto a disk-shaped aluminum alloy substrate (50 mm in diameter and 5 mm in thickness) in a thickness of about 300 μm. The film surface was grounded, and was finished by polishing to a superficial roughness Rz of 0.4 μm or less, thereby forming a surface for testing friction.

The oxygen concentration of the sliding surface was 5% by weight (Note that it was measured by an electron-beam micro analyzer (EPMA).).

A disk-shaped test piece was manufactured by using the resultant sliding material, and was assessed for the friction coefficient under lubrication with an engine oil. Table 1 recites the result.

(2) Example No. 2

An Fe-22% Mo alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 5% by weight.

A disk-shaped test piece was manufactured by using the sliding material, and was assessed for the friction coefficient under lubrication with an engine oil. Table 1 recites the result.

(3) Example No. 3

An Fe-30% Mo alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 10% by weight.

A disk-shaped test piece was manufactured by using the sliding material, and was assessed for the friction coefficient under lubrication with an engine oil. Table 1 recites the result.

(4) Example No. 4

An Fe-18% W alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 3% by weight.

A disk-shaped test piece was manufactured by using the sliding material, and was assessed for the friction coefficient under lubrication with an engine oil. Table 1 recites the result.

(5) Example No. 5

An Fe-22% Mo-1% C-1% Si alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 5% by weight.

A disk-shaped test piece was manufactured by using the sliding material, and was assessed for the friction coefficient under lubrication with an engine oil. Table 1 recites the result.

(6) Example No. 6

An Al-5% Mo alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 3% by weight.

A disk-shaped test piece was manufactured by using the sliding material, and was assessed for the friction coefficient under lubrication with an engine oil. Table 1 recites the result.

(7) Example No. 7

An Al-30% Mo-16% Fe alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 8% by weight.

A disk-shaped test piece was manufactured by using the sliding material, and was assessed for the friction coefficient under lubrication with an engine oil. Table 1 recites the result.

(8) Example No. 8

An Al-30% Mo-16% Fe-10% Si alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 8% by weight.

A disk-shaped test piece was manufactured by using the sliding material, and was assessed for the friction coefficient under lubrication with an engine oil. Table 1 recites the result.

(9) Example No. 9

An Al-20% Mo-11% Fe-5% Cu-0.5% Mg alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 5% by weight.

A disk-shaped test piece was manufactured by using the sliding material, and was assessed for the friction coefficient under lubrication with an engine oil. Table 1 recites the result.

(10) Example No. 10

A Cu-8% Mo-5% Fe alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 5% by weight.

A disk-shaped test piece was manufactured by using the sliding material, and was assessed for the friction coefficient under lubrication with an engine oil. Table 1 recites the result.

(11) Example No. 11

A Cu-30% Mo-20% Fe alloy powder was thermal sprayed with a plasma thermal spraying apparatus in atmospheric air onto a disk-shaped aluminum alloy substrate in a thickness of about 300 μm. The film surface was grounded, and was finished by polishing to a superficial roughness Rz of 0.4 μm or less, thereby forming a surface for testing friction.

The oxygen concentration of the sliding surface was 8% by weight.

A disk-shaped test piece was manufactured by using the sliding material, and was assessed for the friction coefficient under lubrication with an engine oil. Table 1 recites the result.

(12) Comparative Example No. 1

An Fe-22% Mo alloy ingot member was cut to the same shape as that of the disk-shaped substrate of the examples, and was finished by polishing to a superficial roughness Rz of 0.3 μm or less, thereby forming a surface for testing friction.

The oxygen concentration of the sliding surface was 0.1% by weight or less.

A disk-shaped test piece was manufactured by using the sliding material, and was assessed for the friction coefficient under lubrication with an engine oil. Table 1 recites the result.

(13) Comparative Example No. 2

An Fe-18% W alloy ingot member was cut to the same shape as that of the disk-shaped substrate of the examples, and was finished by polishing to a superficial roughness Rz of 0.3 μm or less, thereby forming a surface for testing friction.

The oxygen concentration of the sliding surface was 0.1% by weight or less.

A disk-shaped test piece was manufactured by using the sliding material, and was assessed for the friction coefficient under lubrication with an engine oil. Table 1 recites the result.

(14) Comparative Example No. 3

A cast steel (FC230) ingot member was cut to the same shape as that of the disk-shaped substrate of the examples, and was finished by polishing to a superficial roughness Rz of 0.3 μm or less, thereby forming a surface for testing friction.

The oxygen concentration of the sliding surface was 0.1% by weight or less.

A disk-shaped test piece (frictional test piece) was manufactured by using the sliding material, and was assessed for the friction coefficient under lubrication with an engine oil. Table 1 recites the result.

Example Nos. 1 through 11 formed the oxides of molybdenum or tungsten with iron, aluminum or copper on the surface as well as inside the film by oxidation by the plasma thermal spraying in air. However, in the ingot members of Comparative Example Nos. 1, 2 and 3, since they were not heated in an oxidizing atmosphere, the surface was not subjected to oxidation, and accordingly the oxygen concentration of the surface was as extremely less as 0.1% by weight or less.

Using the respective test pieces obtained as described above, a friction test was carried under lubrication with an engine oil.

As for the frictional assessment test, a ball-on-disk friction test shown in FIG. 1 was used.

In the drawing, a disk (frictional test piece) is designated at 1, a frictional mating member is designated at 2: SUJ2 ball, φ 6.4 mm, and 0.1 μm Rz or less, a load is designated at 3:5 N, and sliding speed: 0.2 m/s, a lubricating oil is designated at 4: engine oil (CASTLE NEO SJ20 5W20), dropped at a rate of 5 cc/min., and note that the engine oil contained organic molybdenum (Mo-DTC) and sulfur compounds, and a testing temperature: room temperature.

In the test, the ball 2 with the load 3 applied, shown in FIG. 1, was circulated on the disk 1 while dropping the lubricating oil 4, thereby carrying out the friction test.

[Table 1]

In the case of the respective examples, the friction coefficient was 0.10 approximately when starting the friction test, but was thereafter reduced sharply to about 0.07-0.04, and the friction resistance was decreased to ½ approximately.

After the test, the test pieces of Example Nos. 1 through 3 were washed by hexane and acetone to degrease, and the sliding portion was analyzed by XPS, as a result, the formation of $MoS_2$, a sliding product resulting from the reaction of molybdenum with the additives of the engine oil, was recognized in addition to the oxides of molybdenum and iron.

On the other hand, although Comparative Example Nos. 1 and 2 included molybdenum and tungsten, the oxygen concentration was 0.1% by weight or less, and the friction coefficient was as high as 0.09-0.10.

After the test, the sliding portion was analyzed by XPS in the same manner as the examples, as a result, the formation of $MOS_2$ was hardly recognized, though the formation of $MoO_3$ was recognized.

Comparative Example No. 3 was an Fe—Si—C alloy which did not include molybdenum and tungsten, the oxygen was also 0.1% by weight or less, and the friction coefficient was as high as 0.12.

When sliding members containing the oxides of molybdenum and so forth like the examples are applied and are slid by using engine oils including organic molybdenum or sulfur compounds as the lubricating component, not only the formation of molybdenum disulfide, a solid lubricant, is promoted as a sliding product on the sliding surface, but also it is fastened to and held on the sliding surface, and accordingly it is possible to reduce the friction resistance of the sliding members to sustain the anti-seizurability and anti-wearability.

Since the present sliding member forms an oxygen-containing alloy including molybdenum or tungsten in the sliding surface, molybdenum and tungsten turn into the sulfides by way of the oxides to form solid lubricants when organic molybdenum components or sulfur-feeding compounds are contained in lubricating oils. Since the solid lubricants are fastened onto the surface of the sliding material, they are consumed by a lesser extent, show the friction reducing effect maximally and reduce the friction coefficient so that it is possible to sustain the low friction resistance, anti-seizurability and anti-wearability of the sliding member over a long period of time.

The present sliding member can be applied to a variety of machinery and the like such as internal combustion engines like automobile engines, gears and automatic transmissions which are used together with lubricating oils.

The invention claimed is:

1. A sliding member comprising
a base;
a metallic oxygen-containing alloy on the base; and
a lubricating film on the oxygen-containing alloy,
wherein the oxygen-containing alloy consists of:
   at least one of iron, aluminum and copper;
   at least one metallic element selected from the group consisting of molybdenum and tungsten in an amount of from 15 to 80% by weight;
   oxygen in an amount of from 0.5 to 15% by weight; and
   optionally at least one added element selected from the group consisting of chromium, nickel, manganese, carbon, silicon, magnesium, zinc and tin,
wherein the lubricating film comprises a disulfide of at least one of molybdenum and tungsten, and
wherein the lubricating film is fastened firmly to the oxygen-containing alloy.

2. The sliding member set forth in claim 1, wherein the oxygen-containing alloy contains the at least one metallic element selected from the group consisting of molybdenum and tungsten in an amount of from 15 to 60% by weight.

3. The sliding member set forth in claim 1, wherein the oxygen-containing alloy contains the at least one metallic element selected from the group consisting of molybdenum and tungsten in an amount of from 15 to 40% by weight.

4. The sliding member set forth in claim 1, wherein the oxygen-containing alloy comprises the at least one added element in an amount of 15% by weight or less.

5. The sliding member set forth in claim 1, wherein the lubricating film is in direct contact with the oxygen-containing alloy.

6. A method of using a sliding member, the method comprising lubricating the sliding member set forth in claim 1 with a lubricating oil that contains a sulfur-feeding component.

7. The method set forth in claim 6, wherein the sulfur-feeding component comprises an organic molybdenum compound.

8. A process for producing a sliding member, the process comprising

TABLE 1

|  | Alloy | Production Process | Oxygen Concentration of Surface (% by Weight) | Friction Coefficient | Worn Depth (µm) |
|---|---|---|---|---|---|
| Ex. No. 1 | Fe—2.5% Mo | Thermal Spraying in Air | 5 | 0.07 | 1.3 |
| Ex. No. 2 | Fe—22% Mo | Thermal Spraying in Air | 5 | 0.04 | 0.8 |
| Ex. No. 3 | Fe—30% Mo | Thermal Spraying in Air | 10 | 0.04 | <0.5 |
| Ex. No. 4 | Fe—18% W | Thermal Spraying in Air | 3 | 0.06 | <0.5 |
| Ex. No. 5 | Fe—22% Mo—1% C—1% Si | Thermal Spraying in Air | 5 | 0.04 | <0.5 |
| Ex. No. 6 | Al—5% Mo | Thermal Spraying in Air | 3 | 0.06 | 14.3 |
| Ex. No. 7 | Al—30% Mo—16% Fe | Thermal Spraying in Air | 8 | 0.04 | 13.3 |
| Ex. No. 8 | Al—30% Mo—16% Fe—10% Si | Thermal Spraying in Air | 8 | 0.04 | 4.0 |
| Ex. No. 9 | Al—20% Mo—11% Fe—5% Cu—0.5% Mg | Thermal Spraying in Air | 5 | 0.04 | 6.0 |
| Ex. No. 10 | Cu—8% Mo—5% Fe | Thermal Spraying in Air | 5 | 0.07 | 8.3 |
| Ex. No. 11 | Cu—30% Mo—20% Fe | Thermal Spraying in Air | 8 | 0.04 | 3.5 |
| Comp. Ex. No. 1 | Fe—22% Mo | Ingot Member | <0.1 | 0.09 | 1.3 |
| Comp. Ex. No. 2 | Fe—18% W | Ingot Member | <0.1 | 0.10 | 1.3 |
| Comp. Ex. No. 3 | FC230 | Ingot Member | <0.1 | 0.12 | 1.7 | fixing an alloy powder onto a surface of a base in an oxidizing atmosphere, where the alloy powder consists of at least one of iron, aluminum and copper, 15 to 80% by weight of at least one metallic element selected from the group consisting of molybdenum and tungsten, and optionally at least one added element selected from the group consisting of chromium, nickel, manganese, carbon, silicon, magnesium, zinc and tin; and producing the sliding member of claim 1.

9. The process set forth in claim 8, wherein the alloy powder comprises the at least one added element in an amount of 15% by weight or less.

10. The process set forth in claim 8, wherein the alloy powder comprises the at least one metallic element selected from the group consisting of molybdenum and tungsten in an amount of from 15 to 60% by weight.

11. The process set forth in claim 8, wherein the alloy powder comprises the at least one metallic element selected from the group consisting of molybdenum and tungsten in an amount of from 15 to 40% by weight.

12. The process set forth in claim 8, wherein the fixing comprises thermal spraying the alloy powder in air or sintering the alloy powder in an oxidizing atmosphere.

13. The process set forth in claim 8, wherein the fixing comprises thermal spraying the alloy powder in an oxygen-free atmosphere or sintering the alloy powder in an oxygen-free atmosphere.

14. The process set forth in claim 8, wherein the fixing comprises thermal spraying the alloy powder in an oxidizing atmosphere or sintering the alloy powder in an oxidizing atmosphere.

\* \* \* \* \*